(12) United States Patent
Miller et al.

(10) Patent No.: US 8,556,313 B2
(45) Date of Patent: Oct. 15, 2013

(54) MULTI-CONFIGURATION GRAPPLING HOOK SYSTEM

(75) Inventors: Brian M. Miller, Long Beach, CA (US);
John Cramer, Long Beach, CA (US);
David B. Lyon, San Diego, CA (US);
Eric J. Hostetler, Silverado, CA (US);
Bernard M. F. Welsch, Gardena, CA (US)

(73) Assignee: Force Multiplier, LLC, Huntington Beach, CA (US)

( * ) Notice: Subject to any disclaimer, the term of this patent is extended or adjusted under 35 U.S.C. 154(b) by 0 days.

(21) Appl. No.: 13/234,889

(22) Filed: Sep. 16, 2011

(65) Prior Publication Data

US 2013/0069380 A1  Mar. 21, 2013

(51) Int. Cl.
*B66C 1/34* (2006.01)

(52) U.S. Cl.
USPC ........................ 294/82.1; 294/82.11

(58) Field of Classification Search
USPC .......... 294/82.11, 97, 93, 86.4, 82.1, 219, 294/66.1; 114/297, 298, 299, 301–307
See application file for complete search history.

(56) References Cited

U.S. PATENT DOCUMENTS

| 1,295,076 | A | * | 2/1919 | Sherman et al. | 114/305 |
|---|---|---|---|---|---|
| 2,990,800 | A | * | 7/1961 | Chard | 114/298 |
| 4,133,569 | A | * | 1/1979 | Pavack et al. | 294/106 |
| 4,543,904 | A | * | 10/1985 | Puoti | 114/294 |
| 5,388,877 | A | * | 2/1995 | Wenk | 294/219 |
| 5,970,902 | A | * | 10/1999 | Francis | 114/301 |
| 6,062,621 | A | | 5/2000 | Zelazny | |
| 6,079,761 | A | * | 6/2000 | Sadeck | 294/82.1 |
| 6,131,974 | A | | 10/2000 | Waugh | |
| 6,267,424 | B1 | | 7/2001 | Gillette | |
| 6,530,614 | B1 | | 3/2003 | Wooten | |
| 6,948,751 | B2 | | 9/2005 | Wooten | |
| 7,029,353 | B2 | * | 4/2006 | Goodman et al. | 441/84 |
| 7,240,937 | B2 | * | 7/2007 | Wooten et al. | 294/82.1 |
| 2005/0037374 | A1 | | 2/2005 | Melker | |
| 2005/0073161 | A1 | * | 4/2005 | Philbin | 294/82.1 |

* cited by examiner

*Primary Examiner* — Dean Kramer
*Assistant Examiner* — Gabriela Puig
(74) *Attorney, Agent, or Firm* — Charmasson, Buchaca & Leach, LLP

(57) ABSTRACT

A retractable and fast-deploying grappling hook has a plurality of tines foldable around a central shaft that can quickly be individually set into a deployed position or a retracted position with no more than two turns of a capping head. The speed and ease of operation of the deploying and locking mechanism are due in part to the concavely machined undersurface of the head which mirrors the path end of the tines hinged to the side of the shaft. The same locking maneuver and adjustment of the head apply coincidentally to the deployed and retracted tines. A belt-attachable caddy houses a slotted receptacle for a removable plate mounting a take-up reel around which a cable secured to an eyelet at the proximal end of the shaft can be wound.

18 Claims, 14 Drawing Sheets

MULTI-CONFIGURATION GRAPPLING HOOK SYSTEM

FIELD OF THE INVENTION

The present invention relates to grappling hooks, and more specifically to a grappling hook which can be quickly moved between various configurations, and portably deployed and retrieved.

BACKGROUND

Grappling hooks are well known devices, which are used for tethering or securing ropes, cables, to supporting structures and other devices. Grappling hooks are often used in climbing where a cable is secured to one end of the grappling hook. A myriad of other uses of a grappling hook are well know in the art, including pulling, towing, securing, tying, connecting, and anchoring. For example they can: help secure a climbing rope or wire ladder against a cliff, wall or other such obstacle; move obstacles such as barbed wires out of the way; or drag a suspicious package into a ruggedized container.

Each of these potential uses of a grappling hook can require a special tine configuration. Sometimes multiple long tines are used, whereas in other cases no more than two short tines are required.

Traditional grappling hooks such as the one disclosed in U.S. Pat. No. 7,240,937 Wooten et al., employ tines rigidly fixed to a shaft. These tines frequently have sharp teeth to assist in engaging the target supporting structure. One disadvantage of these traditional grappling hooks is that they require significantly greater volume for storage. Furthermore, the cumbersome nature of the traditional grappling hook makes transportation difficult and potentially unsafe. The extended and often sharply pointed, exposed tines can be a safety hazard.

Various folding grappling hooks have been proposed, such as those described in U.S. Pat. Nos. 6,079,761, 6,062,621, and 6,267,424. However, changing the configuration of the tines can be time consuming and/or require relatively intricate manipulations. Such manipulations and the luxury of time may be unavailable in some situations where the grappling hook is to be used.

Under emergency conditions where lives are threatened, it becomes imperative that the grappling hook be easily and quickly brought to the required configuration.

Therefore, there is a need for a multi-configuration grappling hook device and method which addresses one or more of the above problems.

SUMMARY

The principal and secondary objects of the invention are to provide improved multi-configuration grappling hook system.

These and other objects are achieved by a grappling hook having a movable head for locking the position of at least one tine.

In some embodiments there is provided a grappling hook with retractable tines of different lengths that can be individually locked into a radially deployed position or retracted against the shaft by a short movement of a weighted capping head. In some embodiments, the undersurface of the head is arcuately machined to match the travel of the proximal extremities of the tines, thus reducing the required movement of the head from the unlocking position to the locking one.

In some embodiments there is provided a caddy bag that can be carried on a belt which houses between two rails a handle equipped, removable plate mounting a reel upon which a cable attached to the proximal end of the hook can be wound up.

The content of the original claims is incorporated herein by reference as summarizing features in one or more exemplary embodiments.

In some embodiments there is provided a retractable grappling hook which comprises: a central shaft elongated along a first axis; a plurality of tines; each of said tines being rotatively connected by a pin to a peripheral area of the shaft and including a short proximal lever portion having an end surface and an outer lateral surface on one side of the pin and an elongated grappling portion on an opposite side of the pin; each of said tines being individually pivotable from a deployed position oblique to the shaft to a folded position substantially parallel to the shaft; and an axially movable head adjustable between a tine-unlocking configuration and a tine-locking configuration; wherein the head bears against the axial end surface of a tine in said folded position and against the outer lateral surface of a tine in said deployed position; and wherein the head has a tine-contacting undersurface machined to coincidentally rest against the end surface of a folded tine and the outer lateral surface of a deployed tine when the head is adjusted to the locking position.

In some embodiments the undersurface has a arcuately concave circular area having a radius of concavity centered about the pin.

In some embodiments the radius is substantially equal to the maximum radius of travel of said end surface.

In some embodiments the undersurface further comprises a peripheral margin chamfered to planarly rest against said end surface.

In some embodiments the head further comprises a conical top having a periphery substantially commensurate with the outer radial extent of said tine in said folded position.

In some embodiments a plurality of said tine are secured to said shaft at evenly spaced locations.

In some embodiments the a plurality of said tine are interchangably secured to said shaft.

In some embodiments the at least one of said tines has a barbed tip.

In some embodiments there is provided a grappling hook which further comprises: an eyelet mounted at a second end of said shaft; a take-up reel; and a length of cable having a first end tied to said eyelet and an opposite second end wound upon said reel.

In some embodiments there is provided a grappling hook which further comprises: a plate; an axle projecting perpendicularly from a median area of said plate and rotatively supporting said reel; and a carrying handle attached to a side of said plate.

In some embodiments there is provided a grappling hook which further comprises: a caddy which comprises: a rigid flat wall; and a pair of spaced apart, parallel rails on said wall slidingly holding said plate therebetween.

In some embodiments at least two of said tines are of different lengths.

In some embodiments there is provided a retractable grappling hook which comprises: a central shaft having a longitudinal first axis and a cross-section radius; a head movably secured to a first end of said shaft, sais head being axially adjustable in relation to said first end to a proximal locking position, and to a distal unlocking position; at least one tine having a pointed extremity and an opposite locking extremity; said tine being pivotally secured to said shaft proximately to said locking extremity about a second axis perpendicular to said first axis; said head comprising a cap having an undersurface defining a circular, arcuately concave area having a radius centered substantially about said second axis when said head is adjusted to said unlocking position; and said locking extremity being held against said shaft when said head is adjusted to said position.

In some embodiments said locking extremity comprises: an inwardly oblique end-portion having an outwardly-facing shoulder surface; and a bearing surface substantially perpendicular to said shoulder surface.

In some embodiments said head further comprises a conical top having a periphery substantially commensurate with the outer extent of said tine in said locking position.

In some embodiments said cap bears against said bearing surface when said head is to said locking position.

In some embodiments a plurality of said tine are secured to said shaft at evenly spaced locations.

In some embodiments there is provided a retractable grappling hook which further comprises: an eyelet mounted at a second end of said shaft; a take-up reel; and a length of cable having a first end tied to said outlet and an opposite second end wound-up on said reel.

In some embodiments there is provided a retractable grappling hook which further comprises: a plate; an axle projecting perpendicularly from a median area of said plate and rotatively supporting said reel; and a carrying handle attached to a side of said plate.

In some embodiments there is provided a retractable grappling hook which further comprises: a caddy having a rigid flat wall; and a pair of parallel rail on said plate slidingly holding said plate therebetween.

In some embodiments at least two of said tines are of different lengths.

DESCRIPTION OF THE EXEMPLARY EMBODIMENTS

Figure 1:
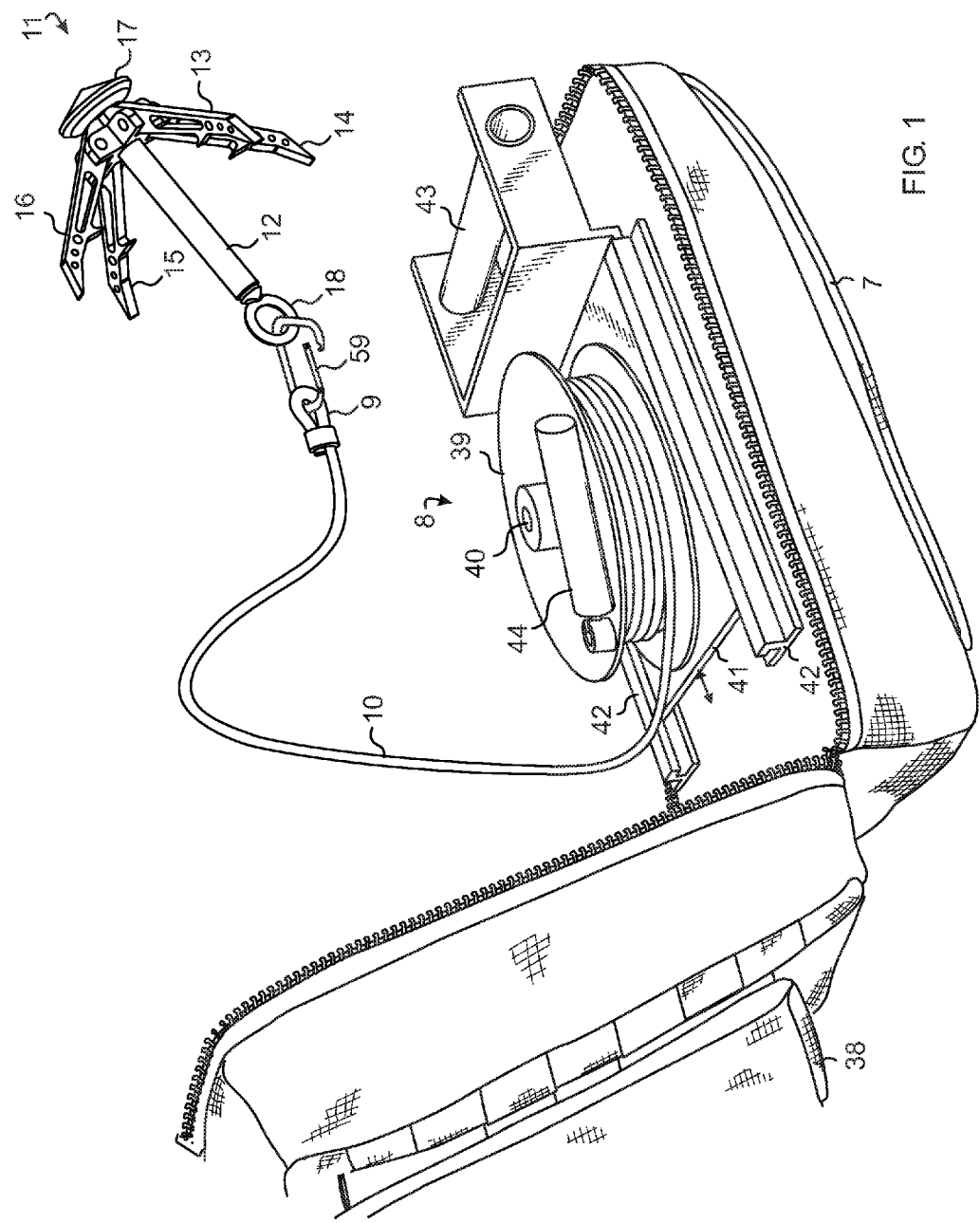
FIG. 1 is a perspective view of an exemplary embodiment of the grappling hook and its accessories.

Referring now to the drawing, there is shown in FIGS. 1-4 a grappling hook system including a retractable grappling hook 11 secured to an end 9 of a flexible tether 10 using a snap clip 59 or other connector. The tether secures at an opposite end to a hand operable spool assembly 8 releasably mounted to a caddy 7 combined with a protective carry pouch 38. The caddy also contains internal space for protectively carrying assorted related equipment including clasps, snap clips, and other tools and accessories.

Figure 2:
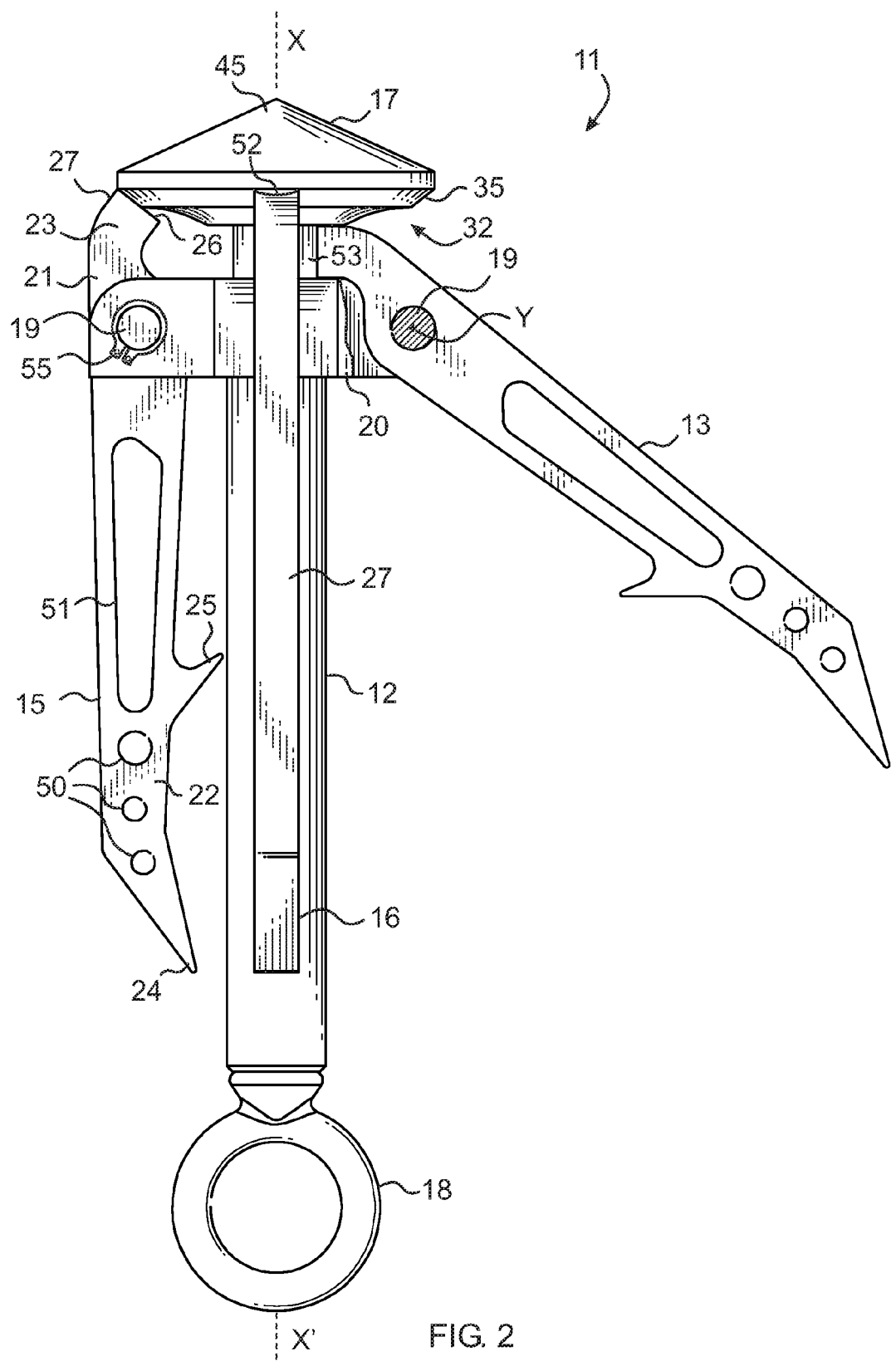
FIG. 2 is a side elevational, partial cutaway view of the grappling hook showing one deployed tine.
Figure 3:
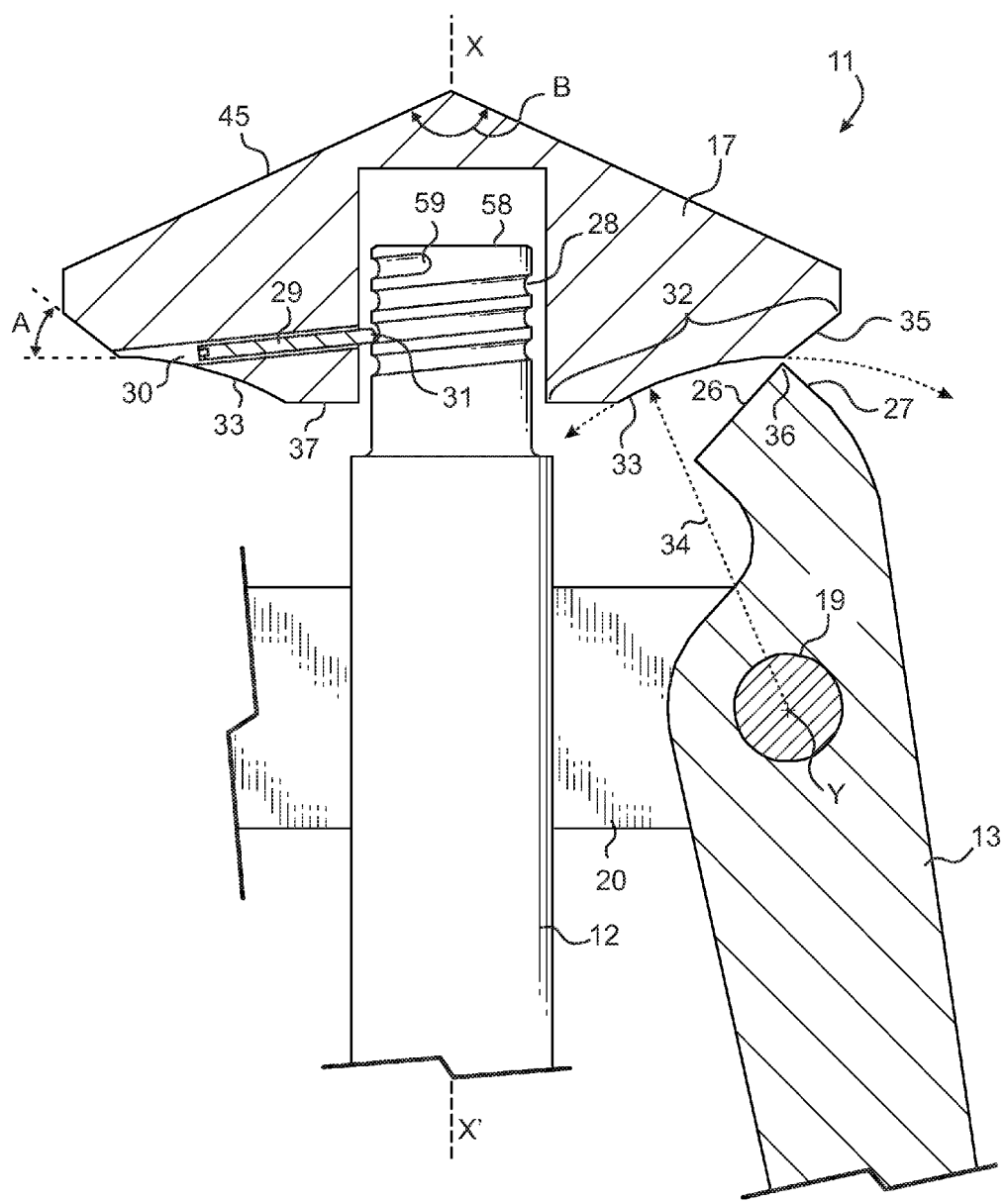
FIG. 3 is a partial cross-sectional view of the hook.

As shown in FIGS. 1-3, the grappling hook comprises a shaft 12 having a central, longitudinal axis X-X', four tines 13, 14, 15, and 16, a locking head 17 at one end, and an attachment eyelet 18 at the opposite end. The tines are secured to the shaft at angularly evenly spaced locations. Pairs of tines can have different lengths and shapes for maximum versatility. To maintain a symmetrically balanced hook, a pair of shorter tines may be located opposite one another while a pair of longer tines can be located opposite one another.

Referring now to FIG. 2, each tine can be individually deployed to a locked oblique position in reference to the shaft 12 as shown by tine 13 in FIG. 2, or held in a folded position substantially parallel to the shaft as shown by tine 15 in the same figure. Each tine is rotatively attached to the shaft by a dedicated pin 19 passing through a bracket 20 projecting radially perpendicularly from the periphery of the shaft and about an axis Y perpendicular and skewed to the longitudinal axis X-X' of the shaft. Optionally, the pin 19 can be releasably held by a removable and replaceable snap ring 55, thereby allowing the tines to be interchangably attached to the shaft.

Accordingly, each tine 13, 14, 15, and 16 includes a short lever portion 21 and a longer grappling portion 22. The lever portion 21 is terminated distally from its pin by a locking extremity 23. The grappling portion 22 terminates distally from its pin in a pointed extremity 24, and may be barbed by one or more spurs 25. Variously sized and positioned cylindrical holes 50 and an oblong slot 51 can be formed though the grappling portion to provide ready and rugged attachment points for clamps, clips, buckles, straps or other structures to allow the hook drag items toward the user as the hook is retrieved.

The locking extremity 23 of the lever portion 21 is slightly oblique in reference to the grappling portion 22 and has an axial end surface 26 having a substantially cylindrical concavity 52 that matches the radius of the periphery of the shaft 53 against which it rests in the deployed configuration of the tine. The lever portion also includes a lateral outer surface 27 for intimately and securedly bearing against the undersurface 32 of the head 17 in the deployed configuration. When the tine is in the folded configuration the end surface 26 of the lever portion is positioned to bear against the chamfered periphery 35 of the head undersurface.

As more specifically illustrated in FIG. 3, the head 17 is moveably mounted the axial threaded tip 58 of the shaft 12 and thus is axially adjustable between the unlocking position shown in FIG. 3 and the locking position shown in FIG. 2. An Allen screw 29 inserted in a channel 30 bored obliquely through head has its tip 31 riding into the groove 28 of the treaded tip. A terminus 59 of the groove limits the track of the tip and thus the axial movement of the head with respect to the shaft. The axially symmetrical under surface 32 of the head has a substantially planar, disc-shaped region 37 oriented perpendicular to the longitudinal axis X-X' of the shaft and located to bear against the lateral outer surface 27 of the lever portion of the tines when they are in the extended configuration. An area radially outwardly adjacent to the disc-shaped region of the undersurface is machined to form a circular concave area 33 whose radius of curvature 34 is centered on the pin 19. A region radially outwardly adjacent to the concave area the undersurface is machined to form a substantially conical section-shaped chamfered peripheral region 35 oriented and located to bear against the end surface of the lever portion of the tines in the folded configuration.

It must be noted that the outer end corner 36 of the end surface follows closely the curvature of the circular concave area 33. Accordingly, the device can be adjusted from the unlocking position of FIG. 3 to the locking position of FIG. 2 with little more than a turn of the head. It shall be further noted that in the locking position, the undersurface 32 of the head bears against the axial end surface 26 of a folded tine and coincidentally against the lateral outer surface 27 of a deployed tine. Further, when a tine is in the deployed configuration and likely subjected to greater momental forces, greater strength of support is given because both the axial end surface 26 bears against the shaft and coincidentally the lateral outer surface 27 bears against the head undersurface disc-shaped region 37.

It shall be noted that angle A of the chamfered region 35 is most preferably about 45 degrees from the horizontal. However, slightly different angles should be acceptable so long as the deployed orientation of the tine is commensurately angled. In other words, the tines can be deployed to angles greater than 45 degrees so long as the chamfer angle is commensurately reduced. This also assumes that the lateral outer surface and end surface of the lever portion remain substantially orthogonal to one another so that the both surfaces are contacted in the deployed configuration by the shaft and head undersurface.

Figure 4:
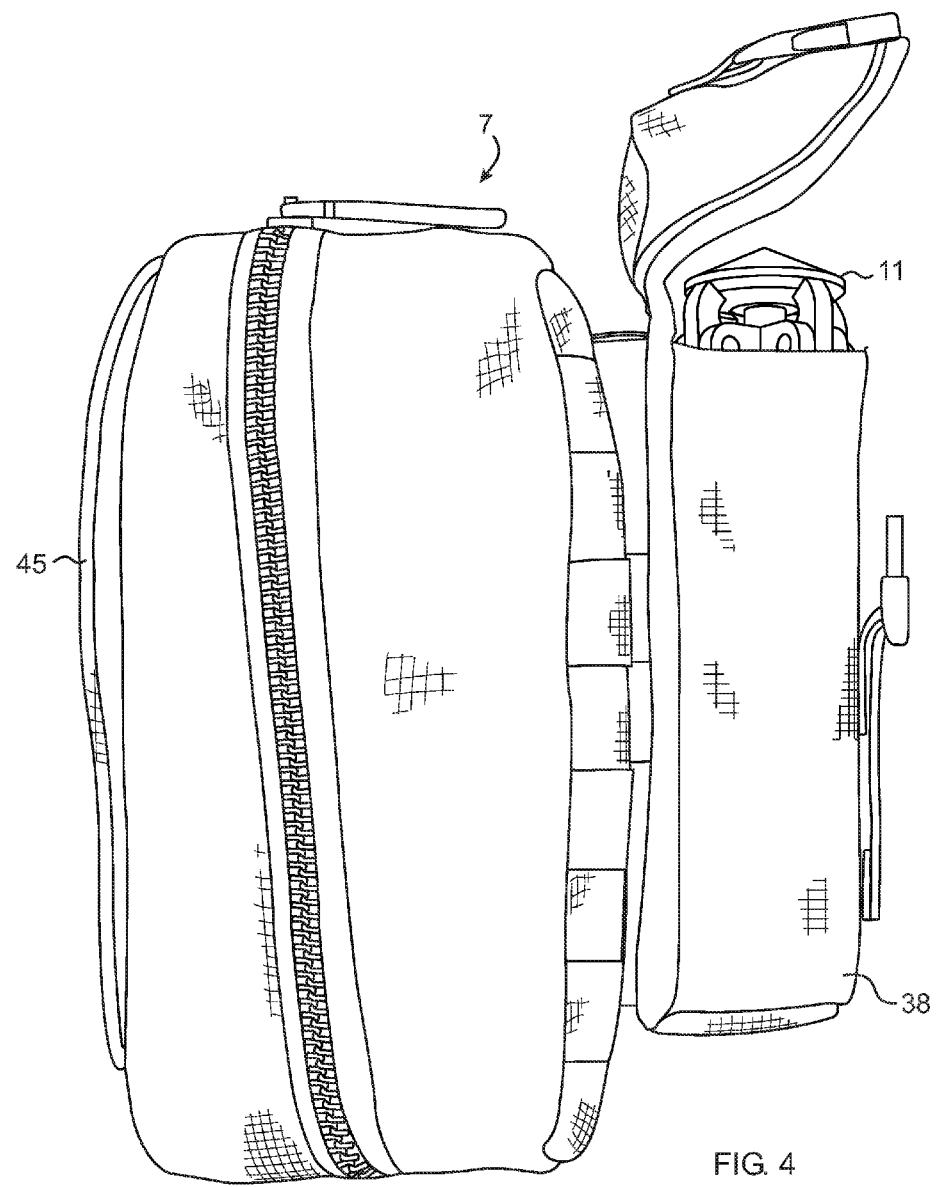
FIG. 4 is a side elevational view of the hook caddy.
Figure 5:
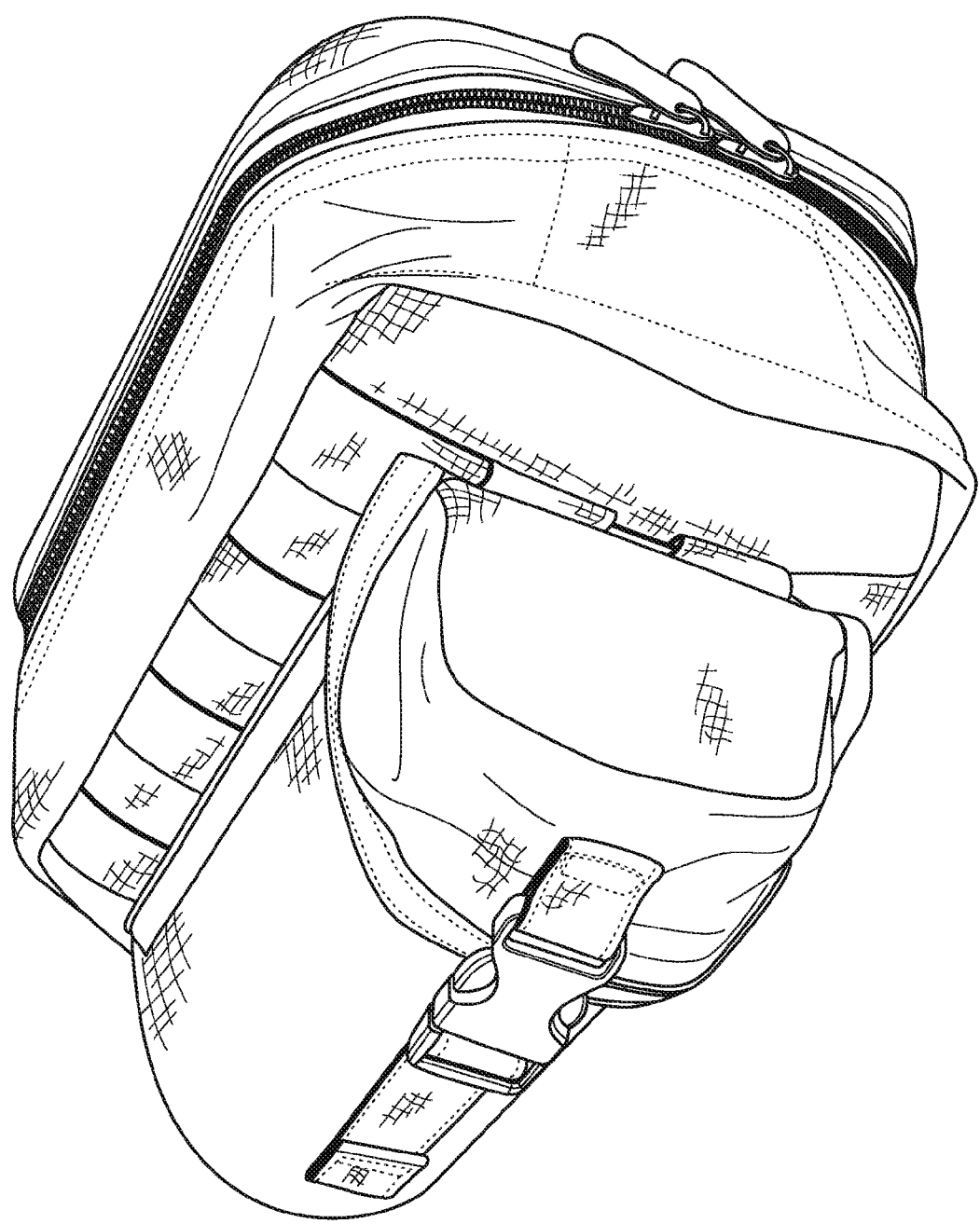
FIGS. 5-10 show an embodiment of our design for a carrying caddy.
Figure 6:
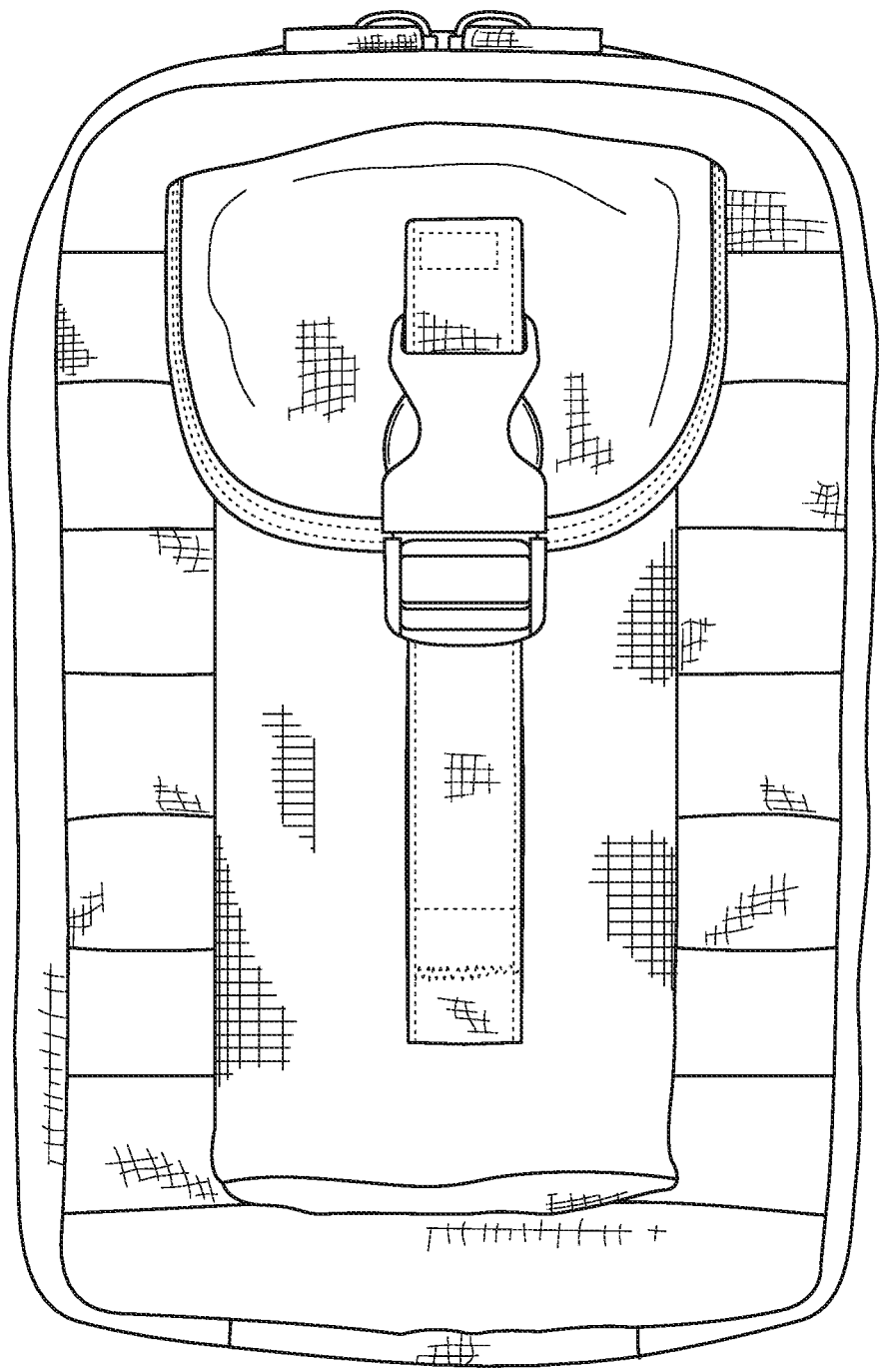
Figure 7:
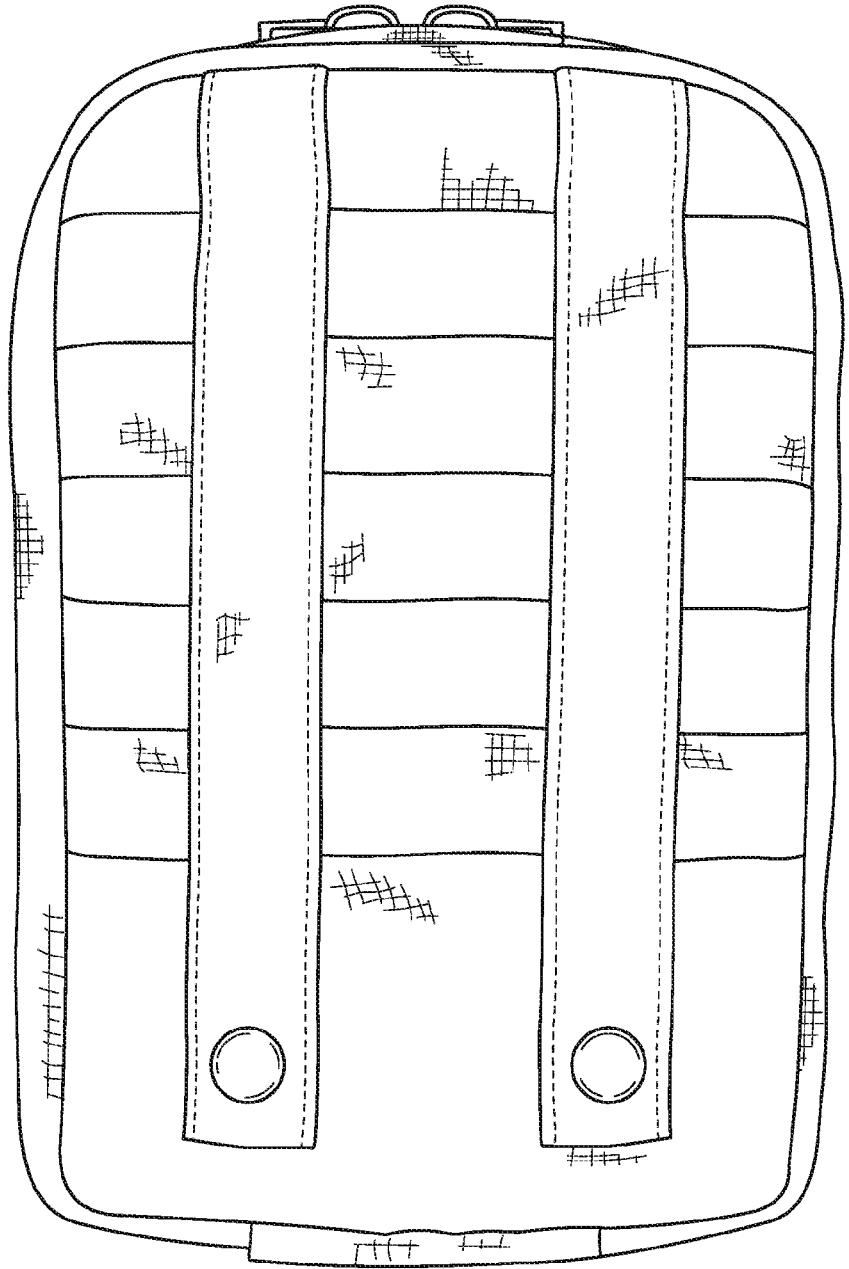
Figure 8:
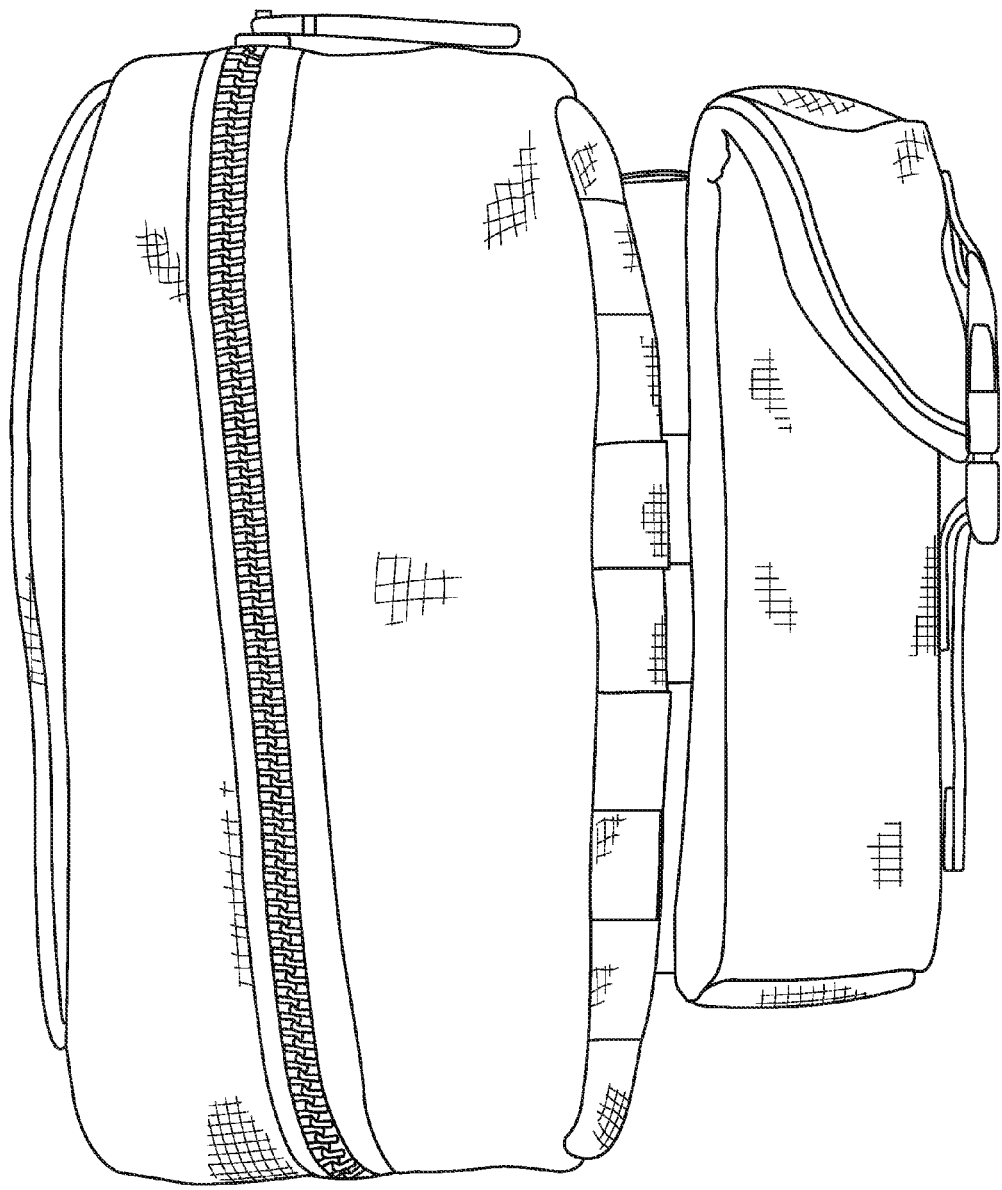
Figure 9:
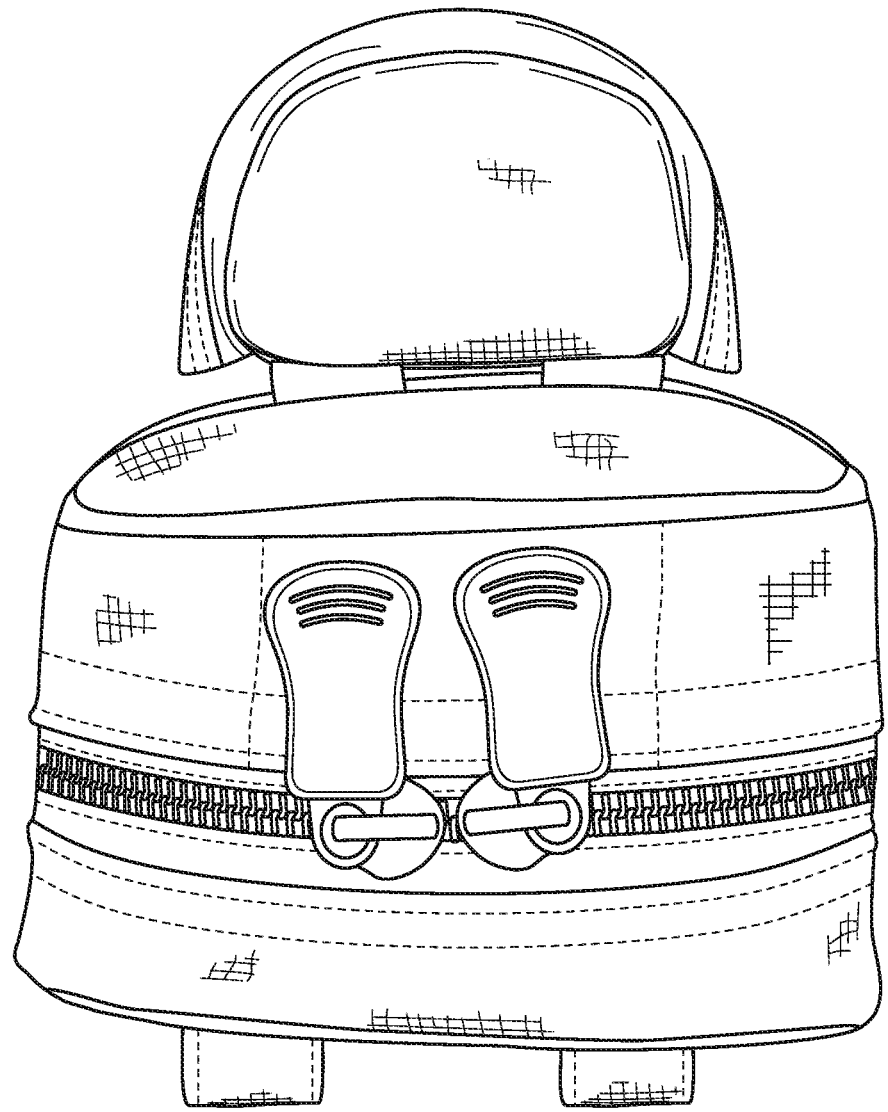
Figure 10:
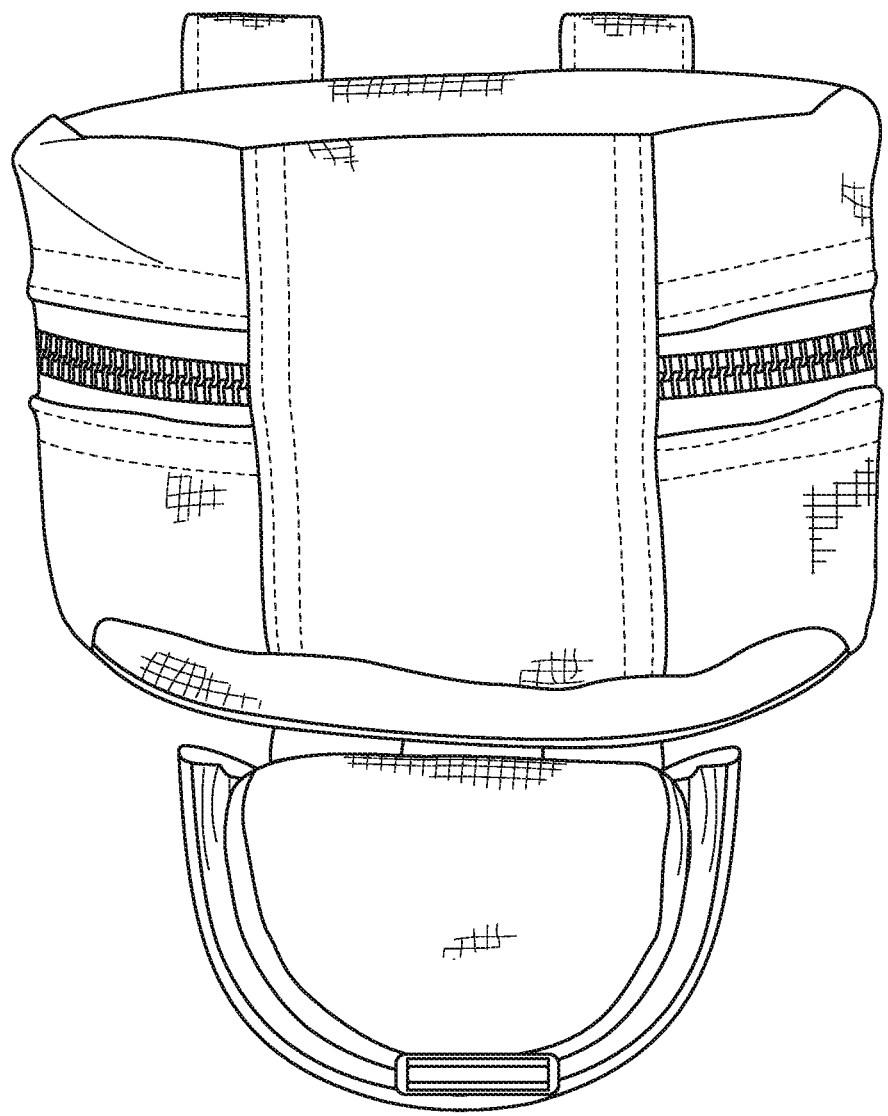
Figure 11:
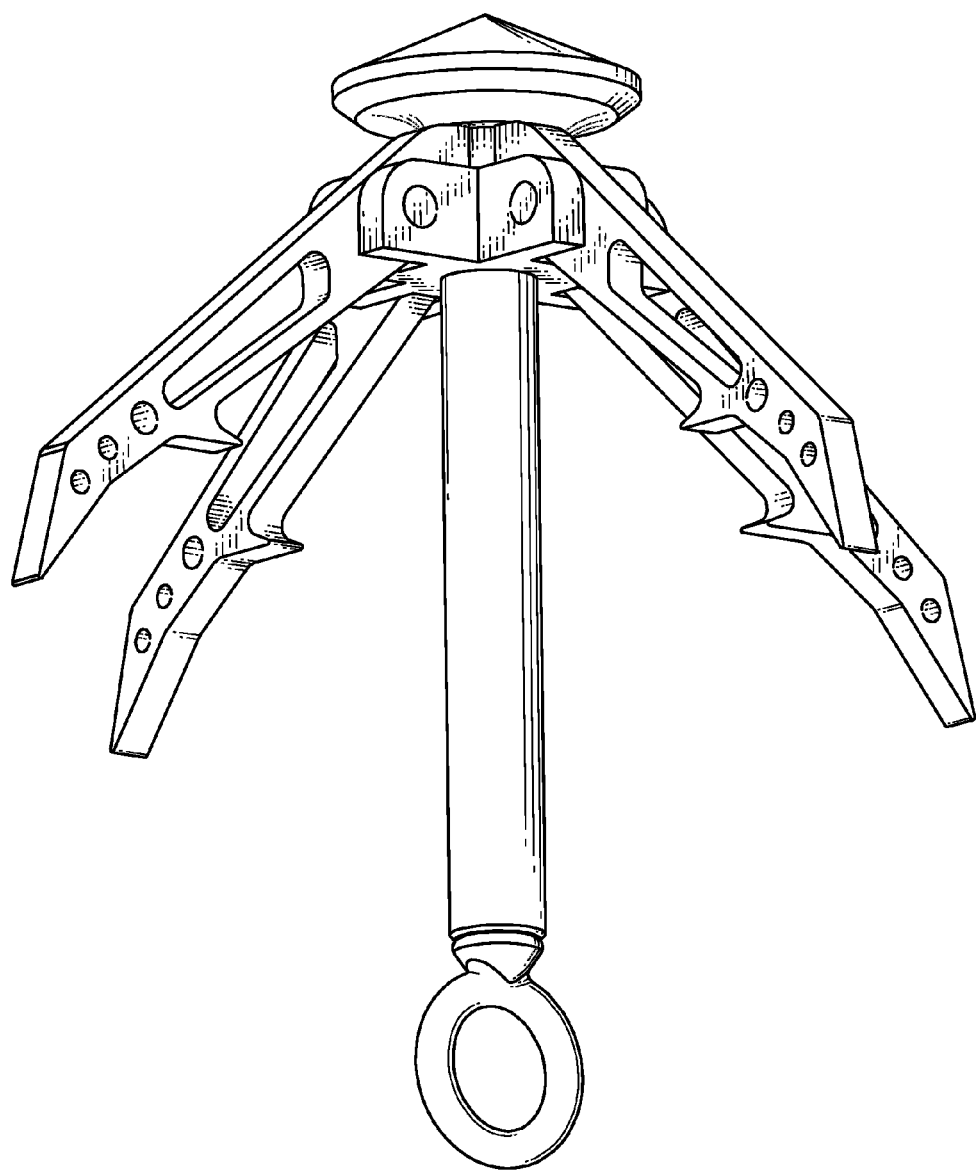
FIGS. 11-14 show an embodiment of our design for a collapsible grappling hook.
Figure 12:
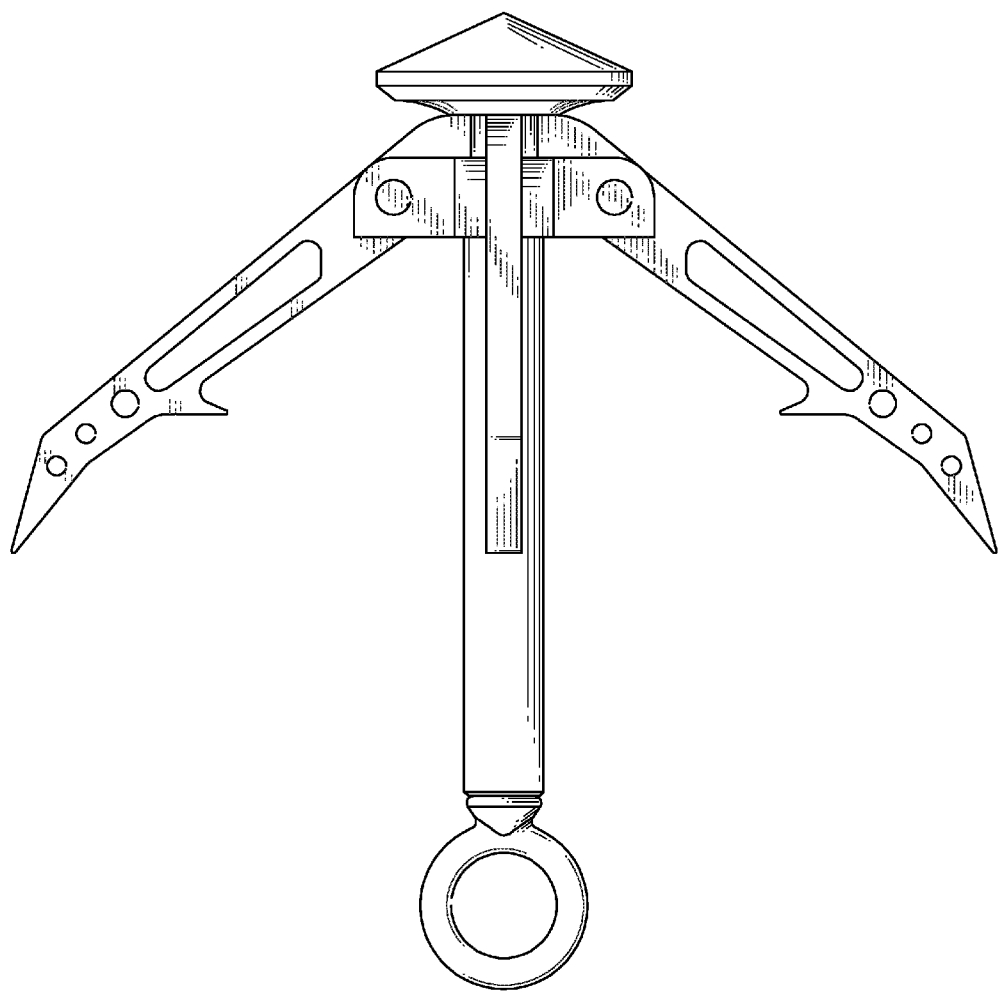
Figure 13:
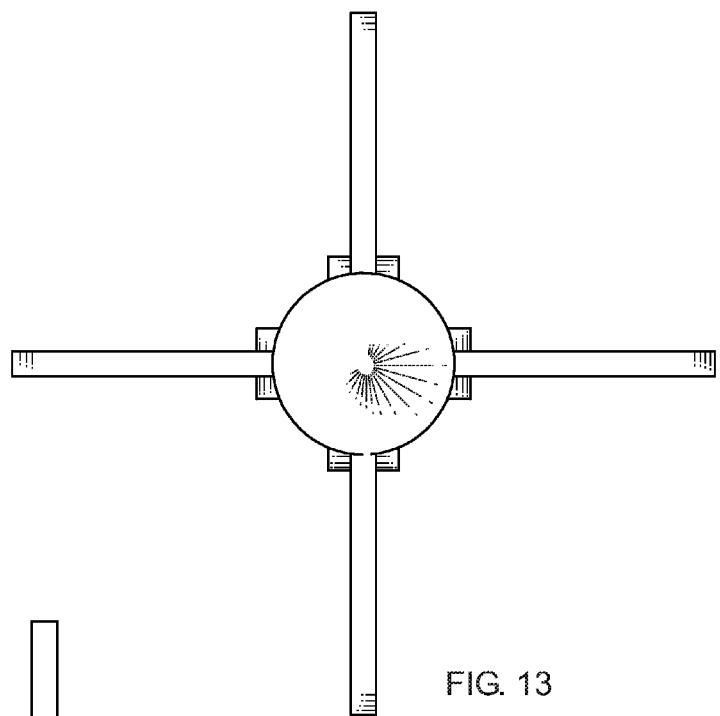
Figure 14:
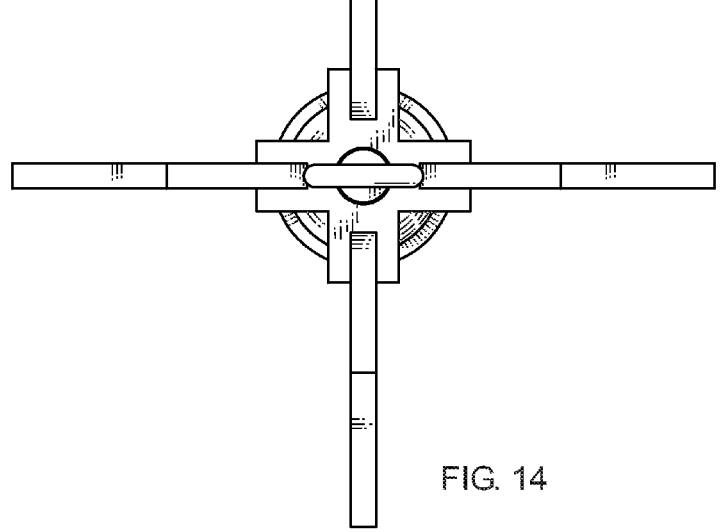
Figure 15:
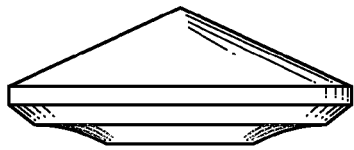
FIGS. 15-19 show an embodiment of our design for a collapsible grappling hook head.
Figure 18:
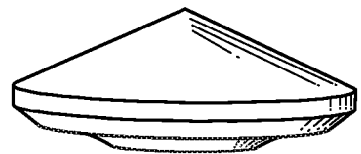
Figure 16:
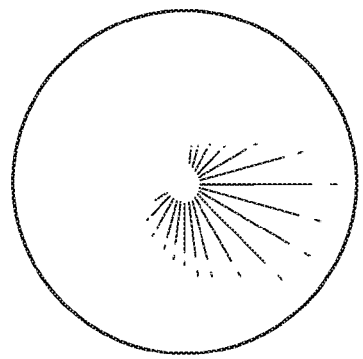
Figure 19:
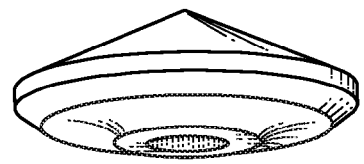
Figure 17:
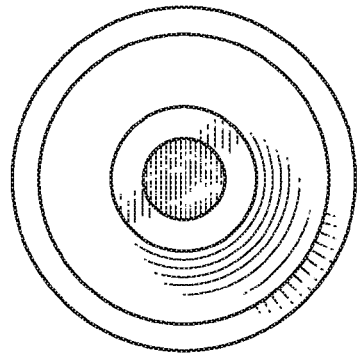

As illustrated in FIGS. 1 and 4, the grappling hook is provided with several accessories including a caddy 7 having a pouch 38 shaped and dimensioned to house the collapsed grappling hook 11. The caddy further contains a take-up reel 39 upon which is wound a line 10 whose opposite extremity 9 is attached to the eyelet 18 at the proximal end of the hook. The reel rotates around an axle 40 which projects from the median area of a plate 41. The plate is slidingly, removably and replaceably held between a pair of parallel rails 42 secured to the frame of the caddy. A handle 43 at a free end of the plate allows for easy removal of the reel from the caddy. A foldable hand crank 44 can be used to spin the reel.

Referring back to FIG. 3, the head 17 has a conical cap surface 45 whose periphery extends approximately to the outer dimension of the folded tines. The conical angle B of the cap surface is most preferably about 130 degrees. However, variations of this angle can be acceptable depending on the applications. Because the head is essentially replaceable the design affords the enhanced ability to have a number of heads having cap surface angles of difference degrees. By concentrating weight in the head, and providing an axially pointed tip, the grappling hook maintains a generally aerodynamic shape so that accurate targeting is achieved. Further, the conical cap is maintained at the front of the device during flight, thus orienting it toward obstacles such as panes of glass for enhanced penetration therethrough. In the folded configuration the hook can be easily loaded into a tubular delivery or shooting mechanism.

One or more of the tines can be set to the deployed or retracted position independent of the other tines. In other words, each tine can be positioned in its retracted or deployed position without regard to the position of the remaining tines.

FIGS. 5-10 show an embodiment of our design for a carrying caddy and pouch combination.

FIGS. 11-14 show an embodiment of our design for a collapsible grappling hook.

FIGS. 15-19 show an embodiment of our design for a collapsible grappling hook head.

While the exemplary embodiments of the invention have been described, modifications can be made and other embodiments may be devised without departing from the spirit of the invention and the scope of the appended claims.

What is claimed is:

1. A retractable grappling hook which comprises:
    a central shaft elongated along a first axis;
    a plurality of tines;
    each of said tines being rotatively connected by a pin to a peripheral area of the shaft and including a short proximal lever portion having an end surface and an outer lateral surface on one side of the pin and an elongated grappling portion on an opposite side of the pin;
    each of said tines being individually pivotable from a deployed position oblique to the shaft to a folded position substantially parallel to the shaft; and
    an axially movable head adjustable between a tine-unlocking configuration and a tine-locking configuration;
    wherein the head bears against the axial end surface of a tine in said folded position and against the outer lateral surface of a tine in said deployed position; and,
    wherein the head has a tine-contacting undersurface machined to coincidentally rest against the end surface of a folded tine and the outer lateral surface of a deployed tine when the head is adjusted to the locking position;
    wherein said undersurface has a arcuately concave circular area having a radius of concavity centered about the pin.

2. The device of claim 1, wherein said radius is substantially equal to the maximum radius of travel of said end surface.

3. The device of claim 1, wherein said head further comprises a conical top having a periphery substantially commensurate with the outer radial extent of said tine in said folded position.

4. The device of claim 1, wherein a plurality of said tines are secured to said shaft at evenly spaced locations.

5. The device of claim 4, wherein a plurality of said tines are interchangably secured to said shaft.

6. The device of claim 4, wherein at least one of said tines has a barbed tip.

7. The device of claim 1, which further comprises:
    an eyelet mounted at a second end of said shaft;
    a take-up reel; and
    a length of cable having a first end tied to said eyelet and an opposite second end wound upon said reel.

8. The device of claim 7, which further comprises:
    a plate;
    an axle projecting perpendicularly from a median area of said plate and rotatively supporting said reel; and
    a carrying handle attached to a side of said plate.

9. The device of claim 8, which further comprises:
    a caddy which comprises:
        a rigid flat wall; and
        a pair of spaced apart, parallel rails on said wall slidingly holding said plate therebetween.

10. A retractable grappling hook which comprises: a central shaft elongated along a first axis;
    a plurality of tines;
    each of said tines being rotatively connected by a pin to a peripheral area of the shaft and including a short proximal lever portion having an end surface and an outer lateral surface on one side of the pin and an elongated grappling portion on an opposite side of the pin;
    each of said tines being individually pivotable from a deployed position oblique to the shaft to a folded position substantially parallel to the shaft; and
    an axially movable head adjustable between a tine-unlocking configuration and a tine-locking configuration;
    wherein the head bears against the end surface of a tine said folded position and against the outer lateral surface of a tine in said deployed position; and,
    wherein the head has a tine-contacting undersurface machined to coincidently rest against the end surface of a folded tine and the outer lateral surface of a deployed tine when the head is adjusted to the locking position;
    wherein said undersurface further comprises a peripheral margin chamfered to planarly rest against said end surface.

11. A retractable grappling hook which comprises:
a central shaft having a longitudinal first axis and a cross-section radius;
a head movably secured to a first end of said shaft, said head being axially adjustable in relation to said first end to a proximal locking position, and to a distal unlocking position;
at least one tine having a pointed extremity and an opposite locking extremity;
said tine being pivotally secured to said shaft proximately to said locking extremity about a second axis perpendicular to said first axis;
said head comprising a cap having an undersurface defining a circular, arcuately concave area having a radius centered substantially about said second axis when said head is adjusted to said unlocking position; and
said locking extremity being held against said shaft when said head is adjusted to said locking position.

12. The device of claim 11, wherein said locking extremity comprises:
an inwardly oblique end-portion having an outwardly-facing shoulder surface; and
a bearing surface substantially perpendicular to said shoulder surface.

13. The device of claim 12, wherein said head further comprises a conical top having a periphery substantially commensurate with the outer extent of said tine in said locking position.

14. The device of claim 13, wherein said cap bears against said bearing surface when said head is in said locking position.

15. The device of claim 13, wherein a plurality of said tines are secured to said shaft at evenly spaced locations.

16. The device of claim 11, which further comprises:
an eyelet mounted at a second end of said shaft;
a take-up reel; and
a length of cable having a first end tied to said outlet and an opposite second end wound-up on said reel.

17. The device of claim 16, which further comprises:
a plate;
an axle projecting perpendicularly from a median area of said plate and rotatively supporting said reel; and
a carrying handle attached to a side of said plate.

18. The device of claim 17, which further comprises:
a caddy having a rigid flat wall; and
a pair of parallel rails on said plate slidingly holding said plate therebetween.

* * * * *